United States Patent
Zhou

(10) Patent No.: US 12,149,519 B2
(45) Date of Patent: Nov. 19, 2024

(54) MEC PLATFORM DEPLOYMENT METHOD AND APPARATUS

(71) Applicant: HUAWEI TECHNOLOGIES CO., LTD., Guangdong (CN)

(72) Inventor: Yan Zhou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 598 days.

(21) Appl. No.: 17/207,232

(22) Filed: Mar. 19, 2021

(65) Prior Publication Data

US 2021/0297410 A1 Sep. 23, 2021

Related U.S. Application Data

(63) Continuation of application No. PCT/CN2019/087776, filed on May 21, 2019.

(30) Foreign Application Priority Data

Sep. 21, 2018 (CN) .......................... 201811109750.7

(51) Int. Cl.
H04L 29/06 (2006.01)
H04L 9/40 (2022.01)

(52) U.S. Cl.
CPC ...... *H04L 63/0823* (2013.01); *H04L 63/0435* (2013.01); *H04L 63/20* (2013.01)

(58) Field of Classification Search
CPC .. H04L 63/0823; H04L 63/0435; H04L 63/20
See application file for complete search history.

(56) References Cited

U.S. PATENT DOCUMENTS 9,942,825 B1 * 4/2018 Narayanan ............ H04L 63/306
10,728,744 B2 * 7/2020 Subramaniam ....... H04L 67/568
(Continued)

FOREIGN PATENT DOCUMENTS

| CN | 104125251 A | 10/2014 |
| CN | 106936766 A | 7/2017 |
| CN | 108292245 A | 7/2018 |

OTHER PUBLICATIONS

Sami Kekki et al., MEC in 5G network, ETSI White Paper No. 28, First edition—Jun. 2018. p. 1-28 (Year: 2018).*

(Continued)

*Primary Examiner* — Kari L Schmidt
*Assistant Examiner* — Fahimeh Mohammadi
(74) *Attorney, Agent, or Firm* — WOMBLE BOND DICKINSON (US) LLP

(57) ABSTRACT

A MEC platform deployment method is provided, relates to the field of communications technologies, and is used to fast deploy a MEC platform. The method includes: A server initiates an authentication process to a cloud server by using a characteristic root apparatus, where a digital certificate of a user and first authentication information are prestored in the characteristic root apparatus; after the authentication succeeds, the server installs a MEC platform component, where the MEC platform component includes LUPF software and/or APP agent software; then, the server executes an edge policy by using the LUPF software, where the edge policy includes a traffic routing policy and/or a charging policy; and/or the server implements service governance on a local application by using the APP agent software. The technical solutions of this application are applicable to a deployment process of a MEC platform.

17 Claims, 7 Drawing Sheets

(56) References Cited

U.S. PATENT DOCUMENTS

| | | | | |
|---|---|---|---|---|
| 10,887,198 | B2* | 1/2021 | Giust | H04L 41/0681 |
| 11,070,442 | B2* | 7/2021 | Giust | H04W 36/0022 |
| 2008/0034216 | A1* | 2/2008 | Law | H04L 9/3273 |
| | | | | 713/168 |
| 2016/0352527 | A1* | 12/2016 | Satoh | H04L 9/3268 |
| 2017/0201585 | A1* | 7/2017 | Doraiswamy | H04L 41/0806 |
| 2017/0251368 | A1* | 8/2017 | Ross | H04W 4/60 |
| 2018/0048514 | A1* | 2/2018 | Arunachalam | H04L 67/535 |
| 2019/0394655 | A1* | 12/2019 | Rahman | H04L 41/142 |
| 2020/0267518 | A1* | 8/2020 | Sabella | H04L 67/12 |
| 2020/0274942 | A1* | 8/2020 | Mueck | H04L 67/56 |
| 2021/0144057 | A1* | 5/2021 | Giust | H04L 41/0806 |
| 2021/0176613 | A1* | 6/2021 | Purkayastha | H04W 4/02 |
| 2021/0211914 | A1* | 7/2021 | de la Oliva | H04W 24/10 |

OTHER PUBLICATIONS

Anta Huang et al., Demo: LL-MEC A SDN-based MEC Platform, Oct. 4, 2017, ACM, pp. 483-485. (Year: 2017).*

Jun Kikuchi et al., VM Migration in Mobile Edge Computing for QoS Improvement with Wireless Multi-Hop Access Networks, Jan. 2018, ACM, pp. 1-8. (Year: 2018).*

Dario Sabella et al., Mobile-Edge Computing Architecture—The role of MEC in the Internet of Things, Sep. 22, 2016, IEEE, vol. 5, Issue: 4, pp. 1-8. (Year: 2016).*

Hongxing Li et al., Mobile Edge Computing: Progress and Challenges, May 23, 2016, IEEE, pp. 83-84. (Year: 2016).*

LV Huazhang et al.,"Standardization Progress and Case Analysis of Edge Computing",Journal of Computer Research and Development,DOI:10.7544/ISSN1000-1239.2018.20170778,487-511,2018,with a machine transition, total 62 pages.

Sarni Kekki et al: "MEC in 5G networks",ETSI White Paper No. 28,Jun. 30, 2018,total 28 pages.

3GPP TR 23.726 V1.1.0 (Sep. 2018),3rd Generation Partnership Project;Technical Specification Group Services and System Aspects;Study on Enhancing Topology of SMF and UPF in 5G Networks(Release 16),total 92 pages.

3GPP TS 23.501 V15.3.0 (Sep. 2018),3rd Generation Partnership Project;Technical Specification Group Services and System Aspects;System Architecture for the 5G System;Stage 2(Release 15),dated Sep. 17, 2018,total 226 pages.

Fabio Giust et al.,"MEC Deployments in 4G and Evolution Towards 5G",ETSI White Paper No. 24, Feb. 1, 2018, total 24 pages.

* cited by examiner

ND APPARATUS

CROSS-REFERENCE TO RELATED APPLICATIONS

This application is a continuation of International Application No. PCT/CN 2019/087776, filed on May 21, 2019, which claims priority to Chinese Patent Application No. 201811109750.7, filed on Sep. 21, 2018. The disclosures of the aforementioned applications are hereby incorporated by reference in their entireties.

TECHNICAL FIELD

This application relates to the field of communications technologies, and in particular, to a multi-access edge computing (MEC) platform deployment method and apparatus.

BACKGROUND

MEC deploys some service processing and resource scheduling functions of applications, content, and a core network to a network edge close to an access side, so that the content and a service are closer to a user, to improve a mobile network rate, reduce a delay, and improve connection reliability.

Currently, a MEC platform is mainly built by a carrier. The following problems exist when the carrier exclusively builds the MEC platform: (1) If the carrier centrally builds a MEC node for a plurality of users, that is, the MEC node is reused by the plurality of users. A large quantity of users are connected to the MEC node, and a large quantity of forwarding routing tables are also configured on the MEC node. Therefore, a delay for a forwarding routing table lookup increases. In addition, because the MEC node is connected to a plurality of users, services of the plurality of users are affected once the MEC node is changed. (2) If the carrier builds different MEC nodes for different vendors, the carrier cannot deploy more servers due to limited equipment room space on a live network. Therefore, the carrier needs to invest a large amount of money to build anew site, resulting in increased operation costs of the carrier.

The foregoing problems exist when the carrier exclusively builds the MEC platform. Therefore, the carrier needs to cooperate with third parties, such as a virtual network operator, an enterprise, and a service provider, to build MEC platforms in respective network environments and extend edge computing of a carrier network to the third-party network environments. However, currently, deployment of the MEC platform needs to be manually configured by a user, and a configuration process is complex. This makes it difficult to implement a solution of co-building the MEC platform by a plurality of parties.

SUMMARY

This application provides a MEC platform deployment method and apparatus, to fast deploy a MEC platform, and facilitate implementation of a solution of co-building the MEC platform by a plurality of parties.

To achieve the foregoing objective, this application provides the following technical solutions:

According to a first aspect, a MEC platform deployment method is provided, including: A server initiates an authentication process to a cloud server by using a characteristic root apparatus, where a digital certificate of a user and first authentication information are prestored in the characteristic root apparatus; after the authentication succeeds, the server installs a MEC platform component, where the MEC platform component includes local user plane function (LUPF) software and/or application agent (APP agent) software; then, the server executes an edge policy by using the LUPF software, where the edge policy includes a traffic routing policy and/or a charging policy; and/or the server implements service governance on a local application by using the APP agent software.

It can be learned that after the characteristic root apparatus is inserted into the server, the server automatically initiates the authentication process, and after the authentication succeeds, the server automatically installs the MEC platform component and uses the MEC platform component. In this way, plug-and-play deployment of the MEC platform is implemented on the server, facilitating implementation of a solution of co-building the MEC platform by a plurality of parties.

In one embodiment, that a server initiates an authentication process to a cloud server by using a characteristic root apparatus includes: The server obtains the first authentication information from the characteristic root apparatus; the server sends the first authentication information to the cloud server; the server receives second authentication information sent by the cloud server; the server encrypts the second authentication information by using the digital certificate of the user; the server sends the encrypted second authentication information to the cloud server; and the server receives an authentication result sent by the cloud server, where the authentication result is that the authentication succeeds or the authentication fails. In this way, the cloud server can determine, through the authentication process, whether the server is a trusted node, to avoid an untrusted node affecting security of a carrier network.

In one embodiment, after the server initiates the authentication process to the cloud server by using the characteristic root apparatus, the method further includes: After the authentication succeeds, the server receives a session token sent by the cloud server, where the session token is used to identify a session between the cloud server and the server. In this way, in a subsequent information exchange process, information sent by the server to the cloud server carries the session token, so that the cloud server can learn that the information is sent by the server.

In one embodiment, before the server installs the MEC platform component, the method further includes: When an image file of the MEC platform component is prestored in the characteristic root apparatus, the server obtains the image file of the MEC platform component from the characteristic root apparatus; or obtains an image file of the MEC platform component from the cloud server.

In one embodiment, before the server executes the edge policy by using the LUPF software, the method further includes: When the edge policy is prestored in the characteristic root apparatus, the server obtains the edge policy from the characteristic root apparatus; or obtains the edge policy from the cloud server.

In one embodiment, that the server executes an edge policy by using the LUPF software includes: When policy authorization information is prestored in the characteristic root apparatus, the server executes the edge policy by using the LUPF software, where the policy authorization information is used to indicate that the LPUF software has permission to execute the edge policy. In other words, when the policy authorization information is not stored in the characteristic root apparatus, the server cannot execute the edge policy by using the LUPF software. That is, whether a MEC server deployed by a third party may execute the edge policy by using the LUPF software depends on whether the policy authorization information is stored in the characteristic root apparatus. By using the characteristic root apparatus, a carrier can control whether the MEC server deployed by the third party may execute the edge policy by using the LUPF software.

In one embodiment, that the server implements service governance on a local application by using the APP agent software includes: The server registers, with a service governance center by using the APP agent software, a service provided by the local application. In this way, the local application can provide a corresponding service for a terminal.

In one embodiment, that the server implements service governance on a local application by using the APP agent software includes: If the APP agent software detects that a process of the local application is abnormal, the server sends service status information to the service governance center by using the APP agent software, where the service status information is used to notify the service governance center that the service provided by the local application is unavailable. In this way, after learning that the service provided by the local application is unavailable, the service governance center updates a traffic routing rule on a network side, and blocks traffic to the local application whose process is abnormal, to avoid the terminal generating invalid access.

According to a second aspect, a MEC platform deployment apparatus is provided, including: an authentication module, configured to initiate an authentication process to a cloud server by using a characteristic root apparatus, where a digital certificate of a user and first authentication information are prestored in the characteristic root apparatus; an installation module, configured to install a MEC platform component after the authentication succeeds, where the MEC platform component includes local user plane function (LUPF) software and/or application agent (APP agent) software; and an enabling module, configured to execute an edge policy by using the LUPF software, where the edge policy includes a traffic routing policy and/or a charging policy; and/or implement service governance on a local application by using the APP agent software.

In one embodiment, that an authentication module, configured to initiate an authentication process to a cloud server by using a characteristic root apparatus includes the following operations: obtaining the first authentication information from the characteristic root apparatus; sending the first authentication information to the cloud server; receiving second authentication information sent by the cloud server; encrypting the second authentication information by using the digital certificate of the user; sending the encrypted second authentication information to the cloud server; and receiving an authentication result sent by the cloud server, where the authentication result is that the authentication succeeds or the authentication fails.

In one embodiment, the authentication module is further configured to: after the authentication succeeds, receive a session token sent by the cloud server, where the session token is used to identify a session between the cloud server and the server.

In one embodiment, the installation module is further configured to when an image file of the MEC platform component is prestored in the characteristic root apparatus, obtain the image file of the MEC platform component from the characteristic root apparatus; or obtain an image file of the MEC platform component from the cloud server.

In one embodiment, the enabling module is further configured to: when the edge policy is prestored in the characteristic root apparatus, obtain the edge policy from the characteristic root apparatus; or obtain the edge policy from the cloud server.

In one embodiment, that an enabling module is configured to execute an edge policy by using the LUPF software includes: when policy authorization information is prestored in the characteristic root apparatus, executing the edge policy by using the LUPF software, where the policy authorization information is used to indicate that the LPUF software has permission to execute the edge policy.

In one embodiment, that an enabling module is configured to implement service governance on a local application by using the APP agent software includes: registering, with a service governance center by using the APP agent software, a service provided by the local application.

In one embodiment, that an enabling module is configured to implement service governance on a local application by using the APP agent software includes: if the APP agent software detects that a process of the local application is abnormal, sending service status information to the service governance center by using the APP agent software, where the service status information is used to notify the service governance center that the service provided by the local application is unavailable.

According to a third aspect, a server is provided, including: a communications interface, a processor, and a memory. The memory is configured to store a computer-executable instruction. When the server runs, the processor executes the computer-executable instruction stored in the memory, so that the server performs the MEC platform deployment method according to any one of the first aspect.

According to a fourth aspect, a computer-readable storage medium is provided. The computer-readable storage medium stores an instruction. When the computer-readable storage medium is run on a computer, the computer is enabled to perform the MEC platform deployment method according to any one of the first aspect.

According to a fifth aspect, a computer program product including an instruction is provided. When the computer program product is run on a computer, the computer is enabled to perform the MEC platform deployment method according to any one of the first aspect.

According to a sixth aspect, a chip system is provided. The chip system includes a processor, configured to support a server in implementing a function of the MEC platform deployment method according to any one of the first aspect. In one embodiment, the chip system further includes a memory. The memory is configured to store a program instruction and data that are suitable for the server. The chip system may include a chip, or may include a chip and another discrete component.

For technical effects brought by any design manner in the second aspect to the sixth aspect, refer to technical effects brought by different design manners in the first aspect. Details are not described herein again.

DESCRIPTION OF EMBODIMENTS

In this application, a term "at least one" means one or more, and a term "a plurality of" means two or more. The term "and/or" in this application describes only an association relationship for describing associated objects and represents that three relationships may exist. For example, A and/or B may represent the following three cases: Only A exists, both A and B exist, and only B exists.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

The technical solutions provided in the embodiments of this application may be used in a wireless communications system. The wireless communications system may be a long term evolution (LTE) system, an LTE-advanced (LTE-A) system, a 5G system, another future communications system, or the like. The technical solutions provided in the embodiments of this application are applicable to a massive machine type communication (mMTC) scenario, an ultra-reliable and low latency communication (uRLLC) scenario, and the like.

Figure 1:
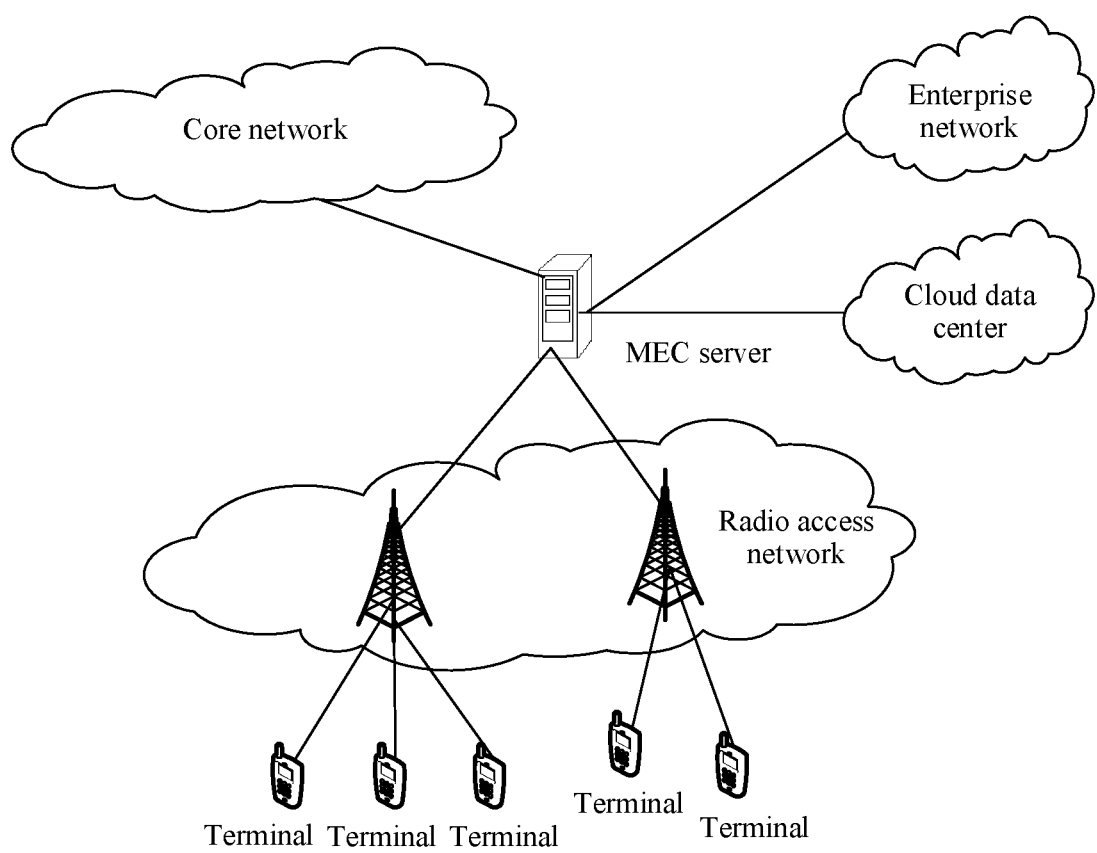
FIG. 1 is a schematic architectural diagram of a MEC system according to an embodiment of this application.

FIG. 1 is a schematic architectural diagram of a MEC system according to an embodiment of this application. A MEC server is deployed between a radio access network and a core network. The MEC server is a server on which a MEC platform is deployed and that is managed by the MEC platform. In addition, the MEC server may be connected to a cloud data center and another network, for example, an enterprise network. In this way, the MEC server provides a service and a cloud computing function for a terminal nearby by using the radio access network. In this embodiment of this application, the MEC server may be established by a carrier, an enterprise, a virtual network operator, or a service provider.

The terminal may be various devices that have a communication function, such as a handheld device, a vehicle-mounted device, a wearable device, a computer, or a network device. For example, the handheld device may be a smartphone. The vehicle-mounted device may be a vehicle-mounted navigation system. The wearable device may be a smart band. The computer may be a personal digital assistant (PDA) computer, a tablet computer, and a laptop computer. The network device may be a residential gateway (RG) and a switch.

Figure 2:
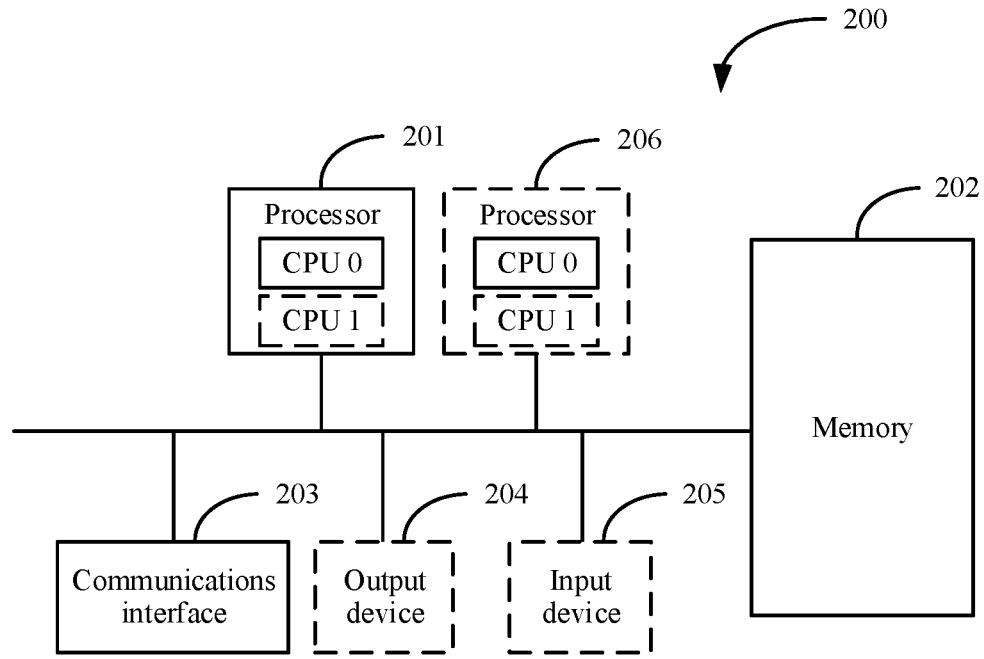
FIG. 2 is a schematic structural diagram of a server according to an embodiment of this application.

FIG. 2 is a schematic structural diagram of hardware of a server according to an embodiment of this application. A server 200 may be configured to deploy a MEC platform. The server 200 includes at least one processor 201, a memory 202, and at least one communications interface 203.

The processor 201 may be a central processing unit (CPU). The processor 201 may include one or more CPUs, for example, a CPU 0 and a CPU 1 in FIG. 2. The server 200 may include a plurality of processors, for example, the processor 201 and a processor 206 in FIG. 2. Each of the processors may be a single-core processor, or may be a multi-core processor.

The communications interface 203 is configured to communicate with another device or a communications network, such as the Ethernet and a wireless local area network (WLAN).

The memory 202 may be a read-only memory (ROM), a random access memory (RAM), an electrically erasable programmable read-only memory (EEPROM), an optical disk or another optical storage device, a magnetic disk or another magnetic storage device, or any medium that may be used to carry or store expected program code in a form of an instruction or a data structure and that may be accessed by a computer. The memory 202 may exist independently, and be connected to the processor 201 through a communications line. Alternatively, the memory 202 may be integrated with the processor 201. The memory 202 is configured to store a computer-executable instruction for executing the solutions of this application. In one embodiment, the computer-executable instruction in this embodiment of the present application may also be referred to as application program code. The processor 201 is configured to execute the computer-executable instruction stored in the memory 202, and control the communications interface 203 to implement a MEC platform deployment method provided in the embodiments of this application.

In one embodiment, the server 200 may further include an output device 204 and an input device 205. For example, the output device 204 may be a liquid crystal display (LCD), a cathode ray tube (CRT) display, a projector, or the like. For example, the input device 205 may be a mouse, a keyboard, a touchscreen device, a sensing device, or the like.

Figure 3:
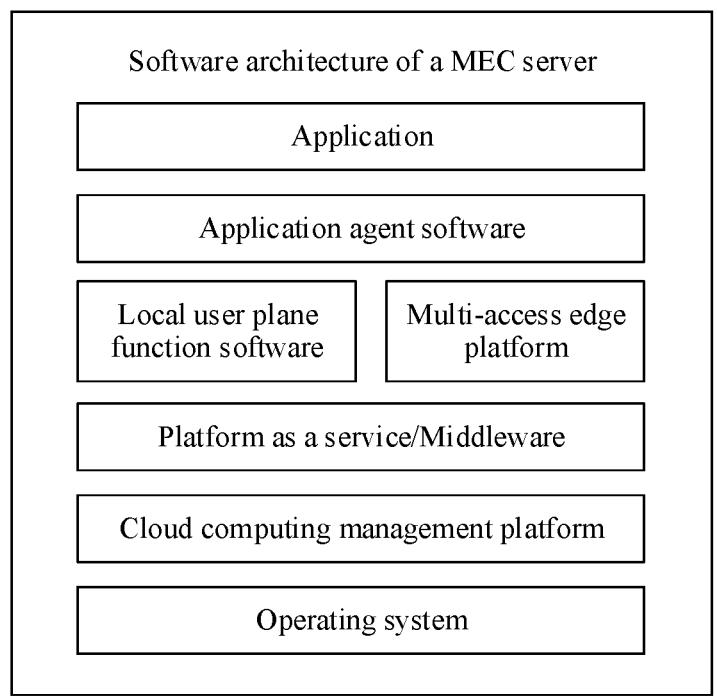
FIG. 3 is a schematic diagram of a software architecture of a MEC server according to an embodiment of this application.

FIG. 3 is a schematic diagram of a software architecture of a MEC server according to an embodiment of this application. The software architecture includes: an operating system (OS), a cloud computing management platform, a platform as a service (PaaS), middleware, a multi-access edge platform (MEP), local user plane function (LUPF) software, an application (APP), and/or an application agent (APP agent) software.

The operating system is a computer program that manages and controls computer hardware and software resources, and is basic system software. Any other software can operate only when the operating system supports the software. Functions of the operating system include managing hardware, software, and data resources of a computer system, controlling program running, improving a human-machine interface, providing support for another application software, and fully using all resources of the computer system.

The cloud computing management platform is used to manage a virtual resource or a physical resource involved in cloud computing. In one embodiment, the cloud computing management platform is deployed by using Openstack. The Openstack is an open-source cloud computing management platform project, including modules such as Nova, Swift, and Glance. Each module is configured to provide a corresponding service. In addition, the Openstack provides an application programming interface (API). Each service is integrated through the API. For example, the Nova module is configured to provide a virtual service. A user may use Nova-API to create and delete a virtual machine. The cloud computing management platform may also be implemented by using another technology. This is not limited in this embodiment of this application.

The PaaS provides a development and test environment, a basic application, and a component in the form of a service for developers to develop, deploy, and manage a software as a service (SaaS) application.

The middleware is an independent system software or service program, is located between an operating system software and a user application software, and is used to connect two independent applications or independent systems. For different operating systems and hardware platforms, the middleware may have a plurality of implementations that comply with interface and protocol specifications. By using middleware, the application may work in environments with a plurality of platforms or operating systems.

The MEP is a set of basic functions required for running the application on a specific virtualization infrastructure and enabling the MEP to provide and use a multi-access edge service. In one embodiment, the MEP is further used to host the multi-access edge service, receive a domain name system (DNS) record, and configure a DNS proxy/server. For example, the multi-access edge service includes an information providing service, a positioning service, and a bandwidth management service.

The LUPF software is used to execute an edge policy, for example, a charging policy and/or a traffic routing policy. The traffic routing policy is used to route traffic that passes through a MEC platform. The charging policy is used to charge the traffic that passes through the MEC platform.

The application may be an enterprise campus application, an industrial application, an internet of things application, a content delivery network (CDN) application, or the like. The enterprise campus application is an application deployed by an enterprise in a campus network of the enterprise. The industrial application is an application used in the industrial field, for example, an application responsible for functions such as data collection, control, and communication in a sensing apparatus. The internet of things application is an application used in the internet of things field, for example, an application used to send alarm information to another vehicle in a vehicle to vehicle (V2V) scenario. The CDN application is used to provide a service such as video live streaming.

The APP agent software is used to implement service governance on a local application, including: managing a service life cycle, monitoring service performance, managing service invoking, and the like.

To fast deploy the MEC platform, the embodiments of this application provide a characteristic root apparatus. In one aspect, the characteristic root apparatus is configured to enable a bare-metal server (that is, a server on which no operating system and no other software are installed) or a server on which an operating system is installed to automatically deploy software included in the software architecture shown in FIG. 3, and enable a server having the software architecture shown in FIG. 3 to automatically execute the edge policy by using the LUPF software, and/or implement the service governance on the local application by using the APP agent software. In this way, a third party such as an enterprise, a virtual network operator, or a service provider can implement plug-and-play deployment of the MEC platform. In another aspect, the characteristic root apparatus is configured to enable a server into which the characteristic root apparatus is inserted to be authenticated by a cloud server, so that the server can become a trusted node in a carrier network. It should be understood that in the carrier network, a trusted node can normally provide a service for a terminal, but an untrusted node cannot provide a service for the terminal. By controlling provision of a characteristic root apparatus, a carrier may control a quantity and areas of MEC servers deployed by a third party.

Figure 4:
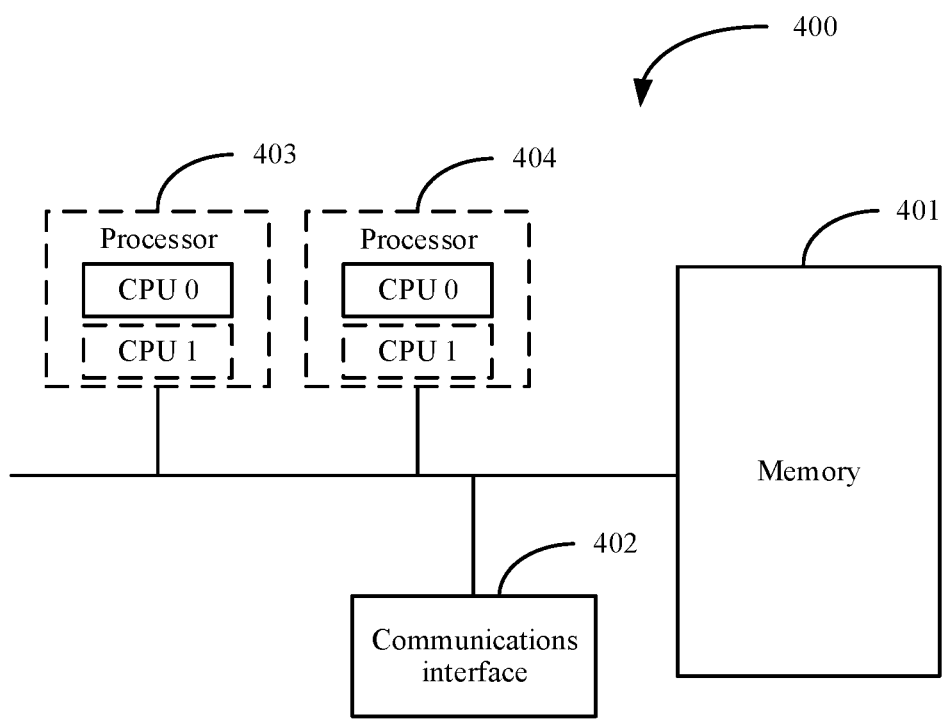
FIG. 4 is a schematic structural diagram of a characteristic root apparatus according to an embodiment of this application.

FIG. 4 is a schematic structural diagram of a characteristic root apparatus according to an embodiment of this application. The characteristic root apparatus 400 includes a memory 401 and at least one communications interface 402. The memory 401 is connected to the communications interface 402 through a communications line.

The memory 401 may be a read-only memory, a random access memory, an electrically erasable programmable read-only memory, an optical disc or another optical storage device, a magnetic disk or another magnetic storage device, or any medium that may be used to carry or store expected program code in a form of an instruction or a data structure and that may be accessed by a computer. In this embodiment of this application, the memory 401 is configured to store a digital certificate of a user and first authentication information. In one embodiment, the memory 401 is further configured to store an edge policy and/or an image file of a MEC platform component.

The communications interface 402 is configured to communicate with another device. For example, when the characteristic root apparatus is inserted into a server, a connection is established between the communications interface 402 of the characteristic root apparatus and a communications interface 203 of the server. In this way, the server can obtain the first authentication information from the characteristic root apparatus.

In one embodiment, the characteristic root apparatus 400 further includes a processor 403. The processor 403 may be a central processing unit. The processor 403 may include one or more CPUs, for example, a CPU 0 and a CPU 1 in FIG. 4. The characteristic root apparatus 400 may include a plurality of processors, for example, the processor 403 and a processor 404 in FIG. 4. Each of the processors may be a single-core processor, or may be a multi-core processor.

Figure 5:
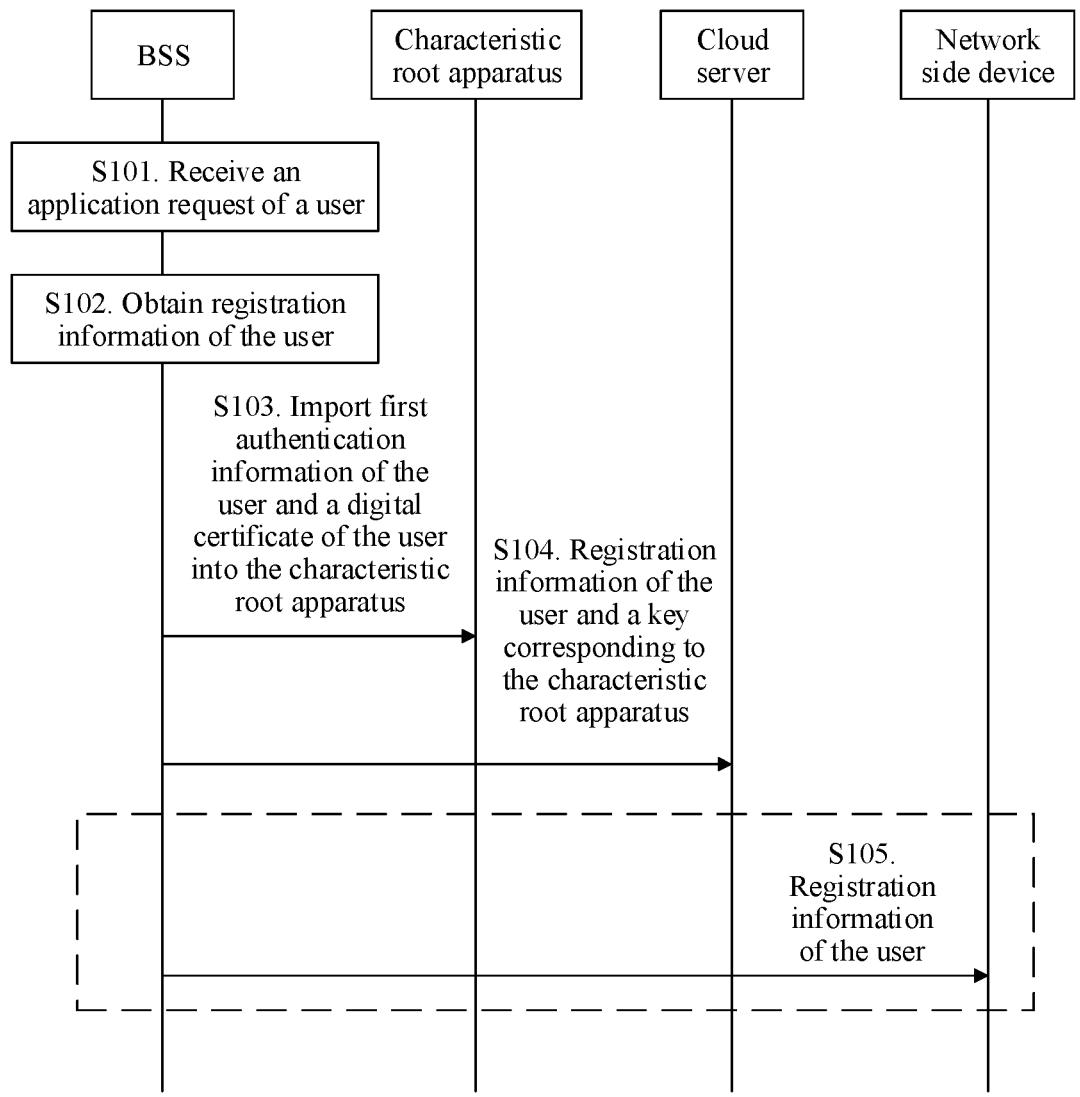
FIG. 5 is a flowchart of a configuration method of a characteristic root apparatus according to an embodiment of this application.

FIG. 5 is a configuration method of a characteristic root apparatus according to an embodiment of this application, and the method includes the following operations.

S101. A business support system (BSS) receives an application request of a user. The application request is used to apply to a carrier for the characteristic root apparatus.

S102. The BSS obtains registration information of the user.

The registration information includes at least the following content:
(1) Identity information of the user. In an example in which the user is a third-party enterprise, the identity information of the user may be a name of the enterprise.
(2) Account information, such as an account, an account balance, account permission, and the like.
(3) Location information. The location information is used to indicate a service area of a MEC platform. The service area is an area in which the MEC platform provides a service. In one embodiment, the service area is determined by the user on a map. In this embodiment of this application, the location information includes latitude and longitude information, a tracking area identity (TAI), or a base station identity.

(4) Plan data, such as a domain name and an access point name (APN).

In one embodiment, the user enters the registration information on a registration page provided by the BSS/an OSS, so that the BSS/OSS system obtains the registration information of the user from the registration page.

S103. The BSS imports first authentication information and a digital certificate of the user into the characteristic root apparatus.

The first authentication information includes the identity information of the user and a login password. In one embodiment, the first authentication information further includes an identifier of the characteristic root apparatus.

The digital certificate includes a key corresponding to the characteristic root apparatus. When an asymmetric cryptography technology is used, a key in the digital certificate is a private key corresponding to the characteristic root apparatus. In one embodiment, the digital certificate further includes the identity information of the user and a digital signature of a certificate authorization center. It should be noted that, for a method for generating the digital certificate of the user, reference may be made to the prior art, and details are not described herein.

In one embodiment, the BSS may further import related data such as an edge policy and an image file of a MEC platform component into the characteristic root apparatus. It should be noted that the BSS opens a management interface that has the edge policy, so that the user can apply for or modify the edge policy by using the BSS.

S104. The BSS sends a key corresponding to the characteristic root apparatus and the registration information of the user to a cloud server.

In this embodiment of this application, when the asymmetric cryptography technology is used, the key sent by the BSS to the cloud server is a public key corresponding to the characteristic root apparatus.

In one embodiment, the configuration method of the characteristic root apparatus according to an embodiment of this application further includes the following operation S105.

S105. The BSS sends the registration information of the user to a network side device.

The network side device includes an operation support system (OSS), a control plane network element, and a user plane network element. For example, the control plane network element is a session management function (SMF) network element. The user plane network element is a user plane function (UPF) network element.

In one embodiment, the BSS first converts the registration information into configuration information, and then sends the configuration information to the network side device.

Based on the technical solution shown in FIG. 5, the user may obtain the characteristic root apparatus from the carrier. In this way, the user can fast deploy the MEC platform on a server by using the characteristic root apparatus.

Figure 6:
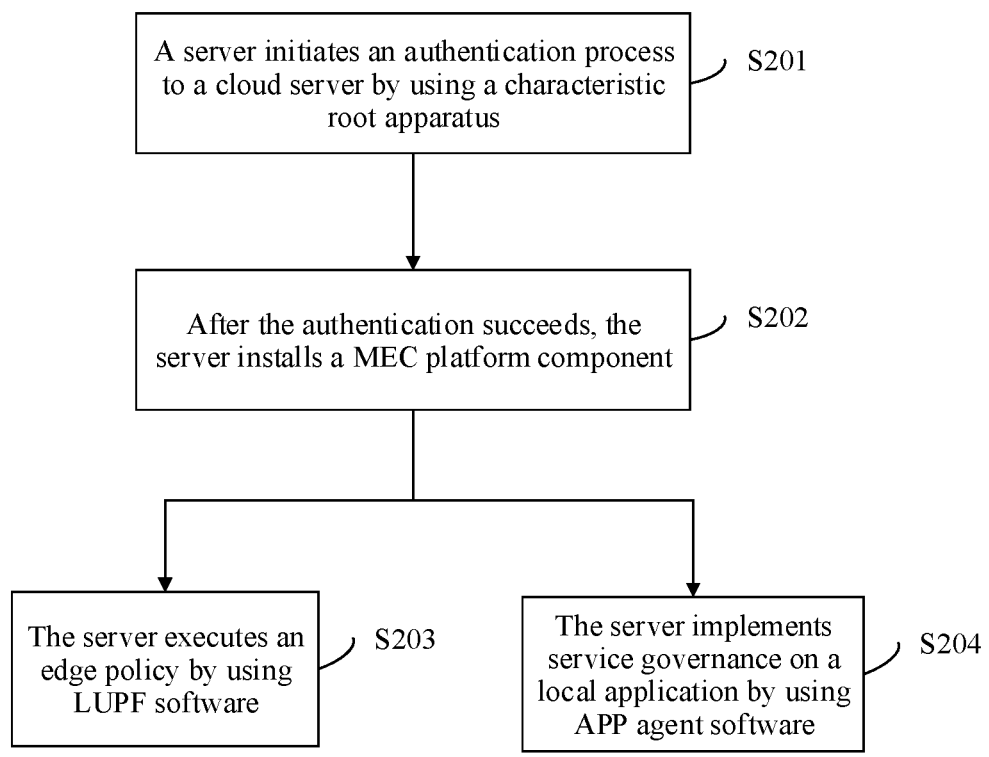
FIG. 6 is a flowchart of a MEC platform deployment method according to an embodiment of this application.

FIG. 6 is a MEC platform deployment method according to an embodiment of this application, including the following operations: S201 to S204.

S201. A server initiates an authentication process to a cloud server by using a characteristic root apparatus.

In one embodiment, after the characteristic root apparatus is inserted into the server, the server runs characteristic root basic software stored in the characteristic root apparatus, the characteristic root basic software automatically establishes a connection between the server and the cloud server, and the characteristic root basic software automatically initiates an authentication process to the cloud server, to verify whether the server is trusted. In this embodiment of this application, for the authentication procedure, refer to the method shown in FIG. 7. Details are not described herein.

In one embodiment, the connection between the server and the cloud server may be a hypertext transfer protocol (http) connection.

In one embodiment, after the authentication succeeds, the server receives a session token sent by the cloud server, where the session token is used to identify a session between the cloud server and the server. In a subsequent information exchange process between the server and the cloud server, information sent by the server to the cloud server carries the session token, so that the cloud server can learn that the information is sent by the server. It should be noted that aging time of the session token is preset or is delivered by the cloud server. When the aging time of the session token expires, the server needs to initiate the authentication process to the cloud server again.

S202. After the authentication succeeds, the server installs a MEC platform component.

The MEC platform component includes LUPF software and/or APP agent software. In one embodiment, the MEC platform component further includes an operating system, a cloud computing management platform, a PaaS, middleware, and the like.

In one embodiment, an image file of the MEC platform component is stored in the characteristic root apparatus, or stored in a database of the cloud server, or stored in the server. It should be noted that the image file may have different names, for example, an installation package and an installation file. This is not limited in this embodiment of this application.

In this embodiment of this application, the server installs the MEC platform component in the following two manners: local deployment and remote deployment. (1) The local deployment means that the server obtains the image file of the MEC platform component from the characteristic root apparatus or a database of the server. Then, the server runs the image file of the MEC platform component to install the MEC platform component. (2) The remote deployment means that the server sends remote deployment information to the cloud server, where the remote deployment information is used to request to obtain the image file of the MEC platform component. Then, the server obtains the image file of the MEC platform component from the cloud server. Finally, the server runs the image file of the MEC platform component to install the MEC platform component. It should be noted that the remote deployment information is used to request all MEC platform components, or the remote deployment information is used to request an MEC platform component required by the server.

In the installation process of the MEC platform component, the server may use both the local deployment and the remote deployment. For example, for MEC platform components stored in the characteristic root apparatus or the server, the server installs these MEC platform components through the local deployment. For MEC platform components that are not stored in the characteristic root apparatus or the server, the server installs these MEC platform components through the remote deployment.

It should be noted that when a version of the MEC platform component installed on the server is outdated, the server updates the MEC platform component from the cloud server.

In one embodiment, before installing the MEC platform component, the server sends registration information to the cloud server, where the registration information is used to enable the server to register as a controlled node in a carrier network. In this way, the server becomes the controlled node in the carrier network. In this way, the cloud server can manage and maintain the server, so that the server installs the MEC platform component, and uses the MEC platform component.

In this embodiment of this application, if the server installs the LUPF software, the server may perform the following operation S203. If the server installs the APP agent software, the server may perform the following operation S204.

S203. The server executes an edge policy by using the LUPF software.

The edge policy includes a traffic routing policy and/or a charging policy. In one embodiment, the edge policy may further include another policy, for example, an access control policy. This is not limited in this embodiment of this application.

In this embodiment of this application, when the edge policy is prestored in the characteristic root apparatus, the server obtains the edge policy from the characteristic root apparatus. Alternatively, the server obtains the edge policy from the cloud server.

In one embodiment, when policy authorization information is prestored in the characteristic root apparatus, the server executes the edge policy by using the LUPF software. The policy authorization information is used to indicate that the LPUF software has permission to execute the edge policy. In this way, if the policy authorization information is not prestored in the characteristic root apparatus, the server may not execute the edge policy by using the LUPF software. In this way, whether a MEC server deployed by a third party may execute the edge policy by using the LUPF software depends on whether the policy authorization information is stored in the characteristic root apparatus. In this way, by using the characteristic root apparatus, a carrier can control whether the MEC server deployed by the third party may execute the edge policy by using the LUPF software.

It should be noted that the policy authorization information may implicitly exist in the characteristic root apparatus. For example, if the edge policy is prestored in the characteristic root apparatus, it indicates that the server into which the characteristic root apparatus is inserted may execute the edge policy by using the LUPF software. If the edge policy is not stored in the characteristic root apparatus, it indicates that the server into which the characteristic root apparatus is inserted may not execute the edge policy by using the LUPF software.

S204. The server implements service governance on a local application by using the APP agent software.

The local application is an application deployed on the server, or an application deployed on another node in a local area network in which the server is located.

The server implements service governance on the local application by using the APP agent software in at least the following cases:

(1) The server registers, with a service governance center by using the APP agent software, a service provided by the local application.

It should be noted that, before the APP agent software registers, with the service governance center, the service provided by the local application, the local application first registers the service with the APP agent software, so that the APP agent software learns of the service provided by the local application to the outside. In one embodiment, the local application registers the service by using a registration API. Alternatively, the local application registers the service by configuring service information and information about a service available detection endpoint on the APP agent software.

In this way, the service governance center indicates a control plane network element and a DNS server to execute a corresponding traffic routing rule, and the control plane network element also indicates a UPF network element to execute a corresponding traffic routing rule, so that traffic generated when a terminal accesses the service provided by the local application may be imported into the server.

(2) If the APP agent software detects that a process of the local application is abnormal, the server sends service status information to the service governance center by using the APP agent software, where the service status information is used to notify the service governance center that the service provided by the local application is unavailable.

In this way, the service governance center updates a traffic routing rule on a network side, and blocks traffic to the local application whose process is abnormal, to avoid invalid access generated by the terminal.

Based on the technical solution shown in FIG. 6, after the characteristic root apparatus is inserted into the server, the server automatically initiates the authentication process, and after the authentication succeeds, the server automatically installs the MEC platform component and uses the MEC platform component. Plug-and-play of the MEC platform is implemented, and this is helpful to implement a solution of co-building the MEC platform by a plurality of parties.

Figure 7:
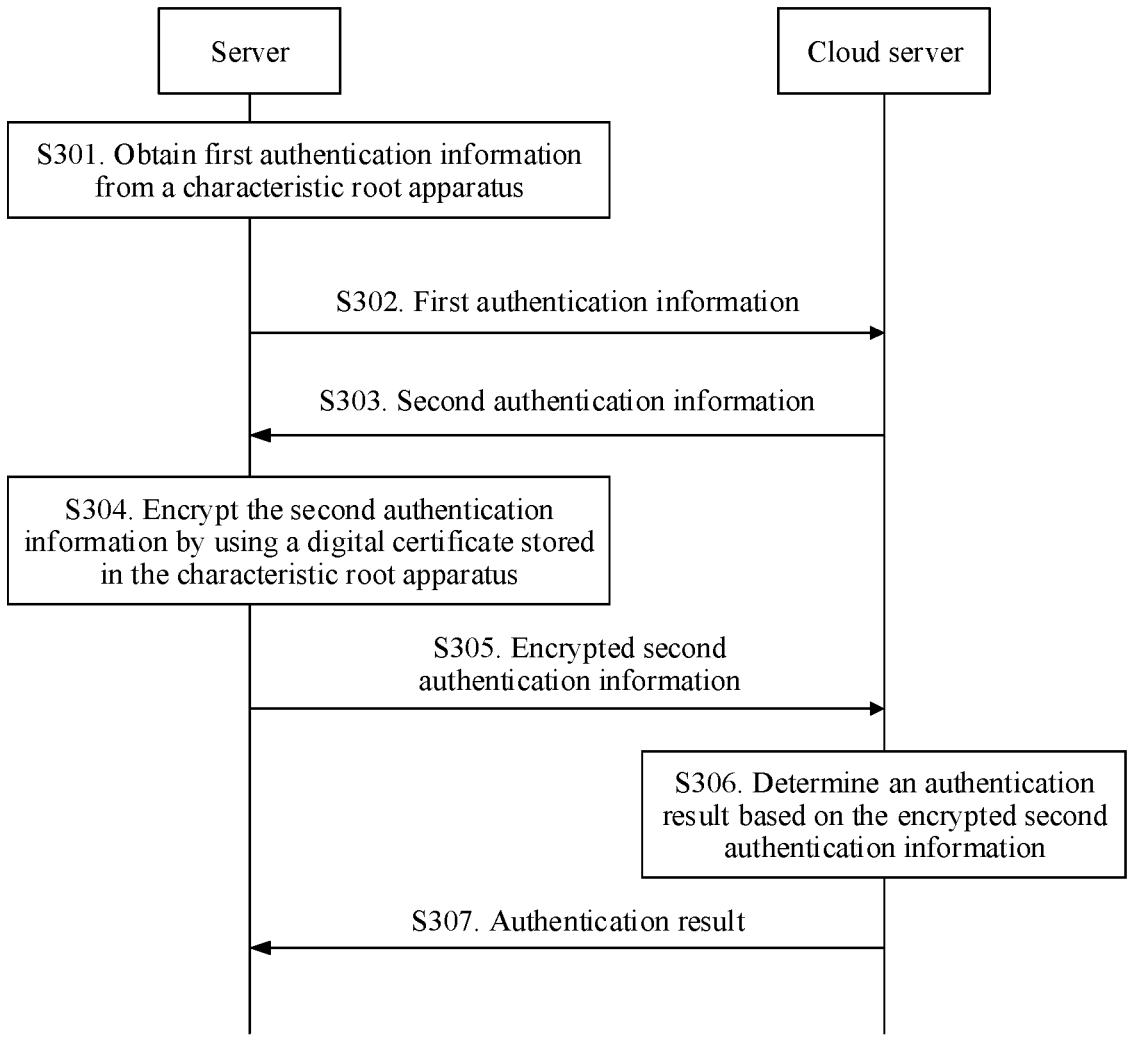
FIG. 7 is a flowchart of an authentication method according to an embodiment of this application.

FIG. 7 is an authentication method according to an embodiment of this application, including the following operations: S301 to S307.

S301. A server obtains first authentication information from a characteristic root apparatus.

S302. The server sends the first authentication information to the cloud server, so that the cloud server receives the first authentication information sent by the server.

S303. The cloud server sends second authentication information to the server, so that the server receives the second authentication information sent by the cloud server.

In one embodiment, after receiving the first authentication information sent by the server, the cloud server verifies whether the first authentication information is correct. When the first authentication information is correct, the cloud server searches a database for the prestored second authentication information, or randomly generates the second authentication information, or generates the second authentication information according to a preset rule. Then the cloud server sends the second authentication information to the server, so that the server receives the second authentication information sent by the cloud server.

That the cloud server generates the second authentication information according to a preset rule includes: generating the second authentication information by using the first authentication information with reference to information in registration information of a user. The cloud server may alternatively generate the second authentication information according to another rule. This is not limited in this embodiment of this application.

S304. The server encrypts the second authentication information by using a digital certificate stored in the characteristic root apparatus.

In one embodiment, when an asymmetric encryption technology is used, the server encrypts the second authentication information by using a private key in the digital certificate, to determine the encrypted second authentication information.

For example, an asymmetric encryption algorithm used by the server is an RSA encryption algorithm, a digital signature algorithm (DSA), or an Elgamal algorithm.

S305. The server sends the encrypted second authentication information to the cloud server, so that the cloud server receives the encrypted second authentication information sent by the server.

S306. The cloud server determines an authentication result based on the encrypted second authentication information.

The authentication result is that the authentication succeeds or the authentication fails.

In one embodiment, when an asymmetric encryption technology is used, the cloud server decrypts the second authentication information by using a public key corresponding to the characteristic root apparatus. If information obtained by decryption is the same as the second authentication information previously sent to the server, the cloud server determines that an authentication result of the server is that the authentication succeeds. If information obtained by decryption is not the same as the second authentication information previously sent to the server, the cloud server determines that the authentication result of the server is that the authentication fails.

S307. The cloud server sends the authentication result to the server, so that the server receives the authentication result sent by the cloud server.

Based on the technical solution shown in FIG. 7, the cloud server may determine whether a server into which the characteristic root apparatus is inserted is a trusted node, to avoid an untrusted node affecting security of a carrier network.

The foregoing mainly describes the solutions provided in the embodiments of this application from a perspective of the server. It should be understood that, to achieve the foregoing functions, the server includes a corresponding hardware structure and/or software module for implementing each function. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8:
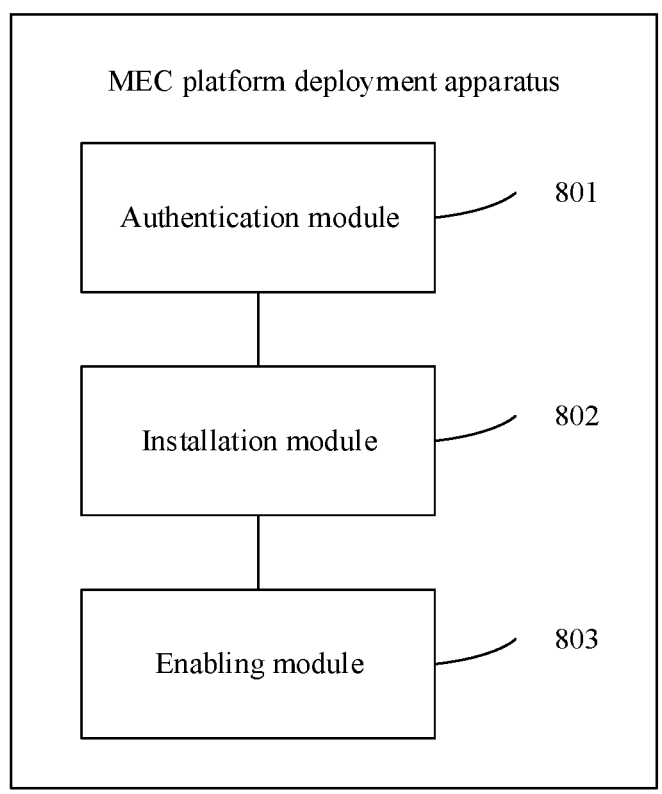
FIG. 8 is a schematic structural diagram of a MEC platform deployment apparatus according to an embodiment of this application.

For example, when each function module is obtained through division based on each function, FIG. 8 shows a schematic structural diagram of a MEC platform deployment apparatus. As shown in FIG. 8, the MEC platform deployment apparatus includes: an authentication module 801, an installation module 802, and an enabling module 803. The authentication module 801 is configured to perform the operation S201 in FIG. 6, and operations S301 to S305 and S307 in FIG. 7, and/or another process used for the technology described in this specification. The installation module 802 is configured to perform the operation S202 in FIG. 6, and/or another process used for the technology described in this specification. The enabling module 803 is configured to perform the operations S203 and S204 in FIG. 6, and/or another process used for the technology described in this specification. All related content of the operations in the foregoing method embodiments may be cited in function descriptions of corresponding function modules, and details are not described herein again.

For example, with reference to the server shown in FIG. 2, the authentication module 801, the installation module 802, and the enabling module 803 in FIG. 8 may be implemented by the processor 201 of the server in FIG. 2, or implemented by the processor 201 of the server in FIG. 2 controlling the communications interface 203. This is not limited in this embodiment of this application.

The embodiments of this application further provide a computer-readable storage medium, where the computer-readable storage medium stores a computer instruction. When the computer-readable storage medium is run on the server shown in FIG. 2, the server is enabled to perform the method shown in FIG. 6 and FIG. 7. The computer-readable storage medium may be any medium accessible by a computer, or a data storage device, such as a server or a data center, integrating one or more media. The medium may be a magnetic medium (for example, a floppy disk, a hard disk, or a magnetic tape), an optical medium (for example, an optical disc), a semiconductor medium (for example, a solid-state disk (SSD)), or the like. In addition, the computer instruction may not only be stored in the computer-readable storage medium, and may also be transmitted from one computer-readable storage medium to another computer-readable storage medium. For example, the computer instruction may be transmitted from a website, a computer, a server, or a data center to another website, another computer, another server, or another data center in a wired (for example, a coaxial cable, an optical fiber, or a twisted pair) or wireless (for example, infrared, radio, or microwave) manner.

The embodiments of this application further provide a computer program product including a computer instruction. When the computer program product is run on a computer, the computer is enabled to perform the method shown in FIG. 6 and FIG. 7.

The server, the computer storage medium, or the computer program product provided in the embodiments of this application are all configured to perform the corresponding methods provided above. Therefore, for beneficial effects that may be achieved thereof, refer to the beneficial effects in the corresponding methods provided above. Details are not described herein again.

Although this application is described with reference to the embodiments, in a process of implementing this application that claims protection, persons skilled in the art may understand and implement another variation of the disclosed embodiments by viewing the accompanying drawings, disclosed content, and the appended claims. A single processor or another unit may implement several functions enumerated in the claims. Some measures are recorded in dependent claims that are different from each other, but this does not mean that these measures may not be combined to produce a better effect.

What is claimed is:

1. A multi-access edge computing (MEC) platform deployment method, the method comprising:
in response to a characteristic root apparatus is inserted into a server, running, by the server, characteristic root basic software stored in the characteristic root apparatus, the characteristic root basic software establishing a connection between the server and a cloud server, and initiating, by the server, an authentication process to the cloud server by using the characteristic root apparatus to verify whether the server is trusted, wherein a digital certificate of a user and first authentication information are prestored in the characteristic root apparatus;

after the authentication succeeds, installing, by the server, a MEC platform component, wherein the MEC platform component comprises local user plane function (LUPF) software and/or application agent (APP agent) software, wherein, before the installing the MEC platform component, the method further comprises:

when an image file of the MEC platform component is prestored in the characteristic root apparatus, obtaining, by the server, the image file of the MEC platform component from the characteristic root apparatus; or obtaining, by the server, an image file of the MEC platform component from the cloud server;

executing, by the server, an edge policy by using the LUPF software, wherein the edge policy comprises a traffic routing policy and/or a charging policy; and/or implementing, by the server, service governance on a local application by using the APP agent software.

2. The MEC platform deployment method according to claim 1, wherein, the initiating the authentication process to the cloud server by using the characteristic root apparatus comprises:

obtaining, by the server, the first authentication information from the characteristic root apparatus;

sending, by the server, the first authentication information to the cloud server;

receiving, by the server, second authentication information sent by the cloud server;

encrypting, by the server, the second authentication information by using the digital certificate of the user;

sending, by the server, the encrypted second authentication information to the cloud server; and receiving, by the server, an authentication result sent by the cloud server, wherein the authentication result is that the authentication succeeds or the authentication fails.

3. The MEC platform deployment method according to claim 1, wherein, after the initiating the authentication process to the cloud server by using the characteristic root apparatus, the method further comprises:

after the authentication succeeds, receiving, by the server, a session token from the cloud server, wherein the session token identifies a session between the cloud server and the server.

4. The MEC platform deployment method according to claim 1, wherein, before the executing the edge policy by using the LUPF software, the method further comprises:

when the edge policy is prestored in the characteristic root apparatus, obtaining, by the server, the edge policy from the characteristic root apparatus; or obtaining, by the server, the edge policy from the cloud server.

5. The MEC platform deployment method according to claim 4, wherein, the executing the edge policy by using the LUPF software comprises:

when policy authorization information is prestored in the characteristic root apparatus, executing, by the server, the edge policy by using the LUPF software, wherein the policy authorization information indicates that the LPUF software has permission to execute the edge policy.

6. The MEC platform deployment method according to claim 4, wherein, the implementing the service governance on the local application by using the APP agent software comprises:

registering, by the server with a service governance center by using the APP agent software, a service provided by the local application.

7. The MEC platform deployment method according to claim 4, wherein, the implementing the service governance on the local application by using the APP agent software comprises:

in case that a process of the local application is abnormal, sending, by the server, service status information to a service governance center by using the APP agent software, wherein the service status information describes that the service governance center that a service provided by the local application is unavailable.

8. A multi-access edge computing (MEC) platform deployment apparatus, comprising:

a processor; and a memory coupled to the processor and storing instructions that, when executed by the processor, cause the apparatus to:

in response to a characteristic root apparatus is inserted, run characteristic root basic software stored in the characteristic root apparatus, the characteristic root basic software establishing a connection between a server and a cloud server, and initiate an authentication process to the cloud server by using the characteristic root apparatus to verify whether the server is trusted, wherein a digital certificate of a user and first authentication information are prestored in the characteristic root apparatus;

install a MEC platform component after the authentication succeeds, wherein the MEC platform component comprises local user plane function (LUPF) software and/or application agent (APP agent) software, wherein the instructions further cause the MEC platform deployment apparatus to: when an image file of the MEC platform component is prestored in the characteristic root apparatus, obtain an image file of the MEC platform component from the characteristic root apparatus; or obtain an image file of the MEC platform component from the cloud server; and execute an edge policy by using the LUPF software, wherein the edge policy comprises a traffic routing policy and/or a charging policy; and/or implement service governance on a local application by using the APP agent software.

9. The MEC platform deployment apparatus according to claim 8, wherein the instructions cause the MEC platform deployment apparatus to:

obtain the first authentication information from the characteristic root apparatus;

send the first authentication information to the cloud server;

receive second authentication information sent by the cloud server;

encrypt the second authentication information by using the digital certificate of the user;

send the encrypted second authentication information to the cloud server; and receive an authentication result sent by the cloud server, wherein the authentication result is that the authentication succeeds or the authentication fails.

10. The MEC platform deployment apparatus according to claim 8, wherein the instructions further cause the MEC platform deployment apparatus to: after the authentication succeeds, receive a session token from the cloud server, wherein the session token identifies a session between the cloud server and the server.

11. The MEC platform deployment apparatus according to claim 8, wherein the instructions further cause the MEC platform deployment apparatus to: when the edge policy is prestored in the characteristic root apparatus, obtain the edge policy from the characteristic root apparatus; or obtain the edge policy from the cloud server.

12. The MEC platform deployment apparatus according to claim 11, wherein the instructions cause the MEC platform deployment apparatus to: when policy authorization information is prestored in the characteristic root apparatus, execute the edge policy by using the LUPF software, wherein the policy authorization information indicates that the LPUF software has permission to execute the edge policy.

13. The MEC platform deployment apparatus according to claim 11, wherein the instructions further cause the MEC platform deployment apparatus to: register, with a service governance center by using the APP agent software, a service provided by the local application.

14. The MEC platform deployment apparatus according to claim 11, wherein the instructions cause the MEC platform deployment apparatus to: in case that a process of the local application is abnormal, send service status information to a service governance center by using the APP agent software, wherein the service status information describes that the service governance center that a service provided by the local application is unavailable.

15. A non-transitory computer-readable storage medium, wherein the computer-readable storage medium stores an instruction, and when the computer-readable storage medium is executed by a computer causes the computer to perform a multi-access edge computing (MEC) platform deployment method to:

in response to a characteristic root apparatus is inserted, run characteristic root basic software stored in the characteristic root apparatus, the characteristic root basic software establishing a connection between a server and a cloud server, and initiate an authentication process to the cloud server by using the characteristic root apparatus to verify whether the server is trusted, wherein a digital certificate of a user and first authentication information are prestored in the characteristic root apparatus;

install a MEC platform component after the authentication succeeds, wherein the MEC platform component comprises local user plane function (LUPF) software and/or application agent (APP agent) software, wherein the method is to further:

when an image file of the MEC platform component is prestored in the characteristic root apparatus, obtain an image file of the MEC platform component from the characteristic root apparatus; or obtain an image file of the MEC platform component from the cloud server; and execute an edge policy by using the LUPF software, wherein the edge policy comprises a traffic routing policy and/or a charging policy; and/or implement service governance on a local application by using the APP agent software.

16. The non-transitory computer-readable storage medium according to claim 15, wherein the method is to:

obtain the first authentication information from the characteristic root apparatus;

send the first authentication information to the cloud server;

receive second authentication information sent by the cloud server;

encrypt the second authentication information by using the digital certificate of the user;

send the encrypted second authentication information to the cloud server; and receive an authentication result sent by the cloud server, wherein the authentication result is that the authentication succeeds or the authentication fails.

17. The non-transitory computer-readable storage medium according to claim 15, wherein the method is to further:

after the authentication succeeds, receive a session token from the cloud server, wherein the session token identifies a session between the cloud server and the server.

* * * * *